United States Patent
Vu et al.

(10) Patent No.: US 7,293,153 B2
(45) Date of Patent: Nov. 6, 2007

(54) METHOD AND SYSTEM FOR DIRECT ACCESS TO A NON-MEMORY MAPPED DEVICE MEMORY

(75) Inventors: Mieu V. Vu, Austin, TX (US); Ricardo Martinez Perez, Plantation, FL (US); Oskar Pelc, Even Yehuda (IL)

(73) Assignee: Freescale Semiconductor, Inc., Austin, TX (US)

( * ) Notice: Subject to any disclaimer, the term of this patent is extended or adjusted under 35 U.S.C. 154(b) by 489 days.

(21) Appl. No.: 10/685,561

(22) Filed: Oct. 14, 2003

(65) Prior Publication Data

US 2005/0080949 A1 Apr. 14, 2005

(51) Int. Cl.
*G06F 3/00* (2006.01)
*G06F 13/12* (2006.01)
*G06F 12/00* (2006.01)

(52) U.S. Cl. .............................. 711/202; 710/8; 710/11; 710/62; 710/64; 711/207

(58) Field of Classification Search ...................... None
See application file for complete search history.

(56) References Cited

U.S. PATENT DOCUMENTS

| | | | |
|---|---|---|---|
| 5,280,598 A | | 1/1994 | Osaki et al. |
| 5,594,721 A | * | 1/1997 | Pan .............................. 370/392 |
| 5,649,142 A | | 7/1997 | Lavelle et al. |
| 5,696,924 A | | 12/1997 | Robertson et al. |
| 6,088,624 A | | 7/2000 | Khan et al. |
| 6,704,875 B1 | | 3/2004 | Kinoshita et al. |
| 2002/0069243 A1 | | 6/2002 | Ravérdy et al. |

FOREIGN PATENT DOCUMENTS

EP 0720341 B1 7/2004

OTHER PUBLICATIONS

X.25 Packet Layey Protocol (PLP) Overview; Jan. 24, 2002; http://www.techfest.com/networking/wan/x25plp.htm; pp. 1-10.*
International Search Report.
Supplementary European Search Report.

* cited by examiner

*Primary Examiner*—Alford Kindred
*Assistant Examiner*—Richard B. Franklin
(74) *Attorney, Agent, or Firm*—Michael J. Balconi-Lamica; James L. Clingan, Jr.

(57) ABSTRACT

A processing system that interacts with external devices has a processor, a memory, and a controller. The memory stores templates that provide access protocol information about the external devices. When an external device is to be accessed, the operating system, which is stored in the memory, instructs the processor to perform the access to the external device. The processor puts the information about the external device on the address portion of the system bus where it is received and interpreted by the controller. The controller in turn retrieves the template for the external device as indicated by the information that was received. After retrieving the template, the controller outputs the information, in the manner indicated by the template, on an external interface bus where the external device is also coupled. The external device then responds according to the information that the controller put on the external interface bus.

5 Claims, 2 Drawing Sheets

METHOD AND SYSTEM FOR DIRECT ACCESS TO A NON-MEMORY MAPPED DEVICE MEMORY

FIELD OF THE INVENTION

This disclosure relates generally to processor based systems, and more particularly, to a method and system for direct access to a non-memory mapped device memory.

RELATED ART

Current commercially available smart phones and handheld devices are generally equipped with a host system and a smart display panel. The smart display panel typically includes an integrated display controller and an on-device memory. Such an integrated display controller normally interfaces to the host system via a dedicated display port or a standard bus interface unit, such as an external interface to main memory (EIM). The display panel also has on-chip video and/or display buffer(s) which are external to the host system memory map, that is, not directly located within the host system memory map. Such on-chip buffer/buffers is/are used to store display data before updating and refreshing the screen display and/or for image and graphics rendering.

However, one problem with the standard bus interface unit in smart phones and handheld devices is that the EIM requires a large number of pins or lines for an address bus, for example, on the order of about 22 lines. A high number of lines is generally too cost prohibitive for use in such a handheld device or smart phone. In addition, in the case of a flip-phone type of mobile device, capacitance and bus loading would also cause timing and bus bandwidth problems since other standard memory devices share the same interface.

Another option is to provide a dedicated display port. In this case, the access to an external device buffer is accomplished in an indirect way. When an application requires the host to get access to the smart display or graphics accelerator, the MCU has to perform a complex series of transactions to establish communication with the device prior to the real transfer. For example, a host processor must send command by command instructions to an external device through a dedicated display interface. The dedicated display interface then relays or forwards the necessarily decoded messages to the external device, allows for some setup time, and perhaps waits for an acknowledgement, prior to resuming the real data transfer. Note that all of these transactions are performed through a dedicated data bus at a low clock speed as compared to a high-performance MCU host. Such an excessive MCU involvement would increase the MCU loading and bus bandwidth requirement, thus, cause a negative impact on the system performance and power consumption.

Another method is to use a full hard-wired interface; however, this fixed hardware method has a significant die-size impact and only support a few specific external devices.

Accordingly, there is a need for an improved method and system apparatus for overcoming the problems in the art as discussed above.

SUMMARY

In a processing system having a processor coupled to a system bus according to one embodiment of the present disclosure, a method of operating a device external to the processor includes instructing the processor to operate with the device. Responding to an instruction for the processor to operate with the device, the processor puts information onto the system bus. Subsequently, a memory map controller interface retrieves the information. In response to the information, the memory map controller interface accesses a template of the device. The template can be selected from a plurality of templates stored in a memory coupled to the system bus. The memory map controller interface then puts instructions onto an external interface bus according to the information and the template. As a result, the device operates according to the instructions.

BRIEF DESCRIPTION OF THE DRAWINGS

The present invention is illustrated by way of example and not limited by the accompanying figures, in which like references indicate similar elements, and in which.

Figure 1:
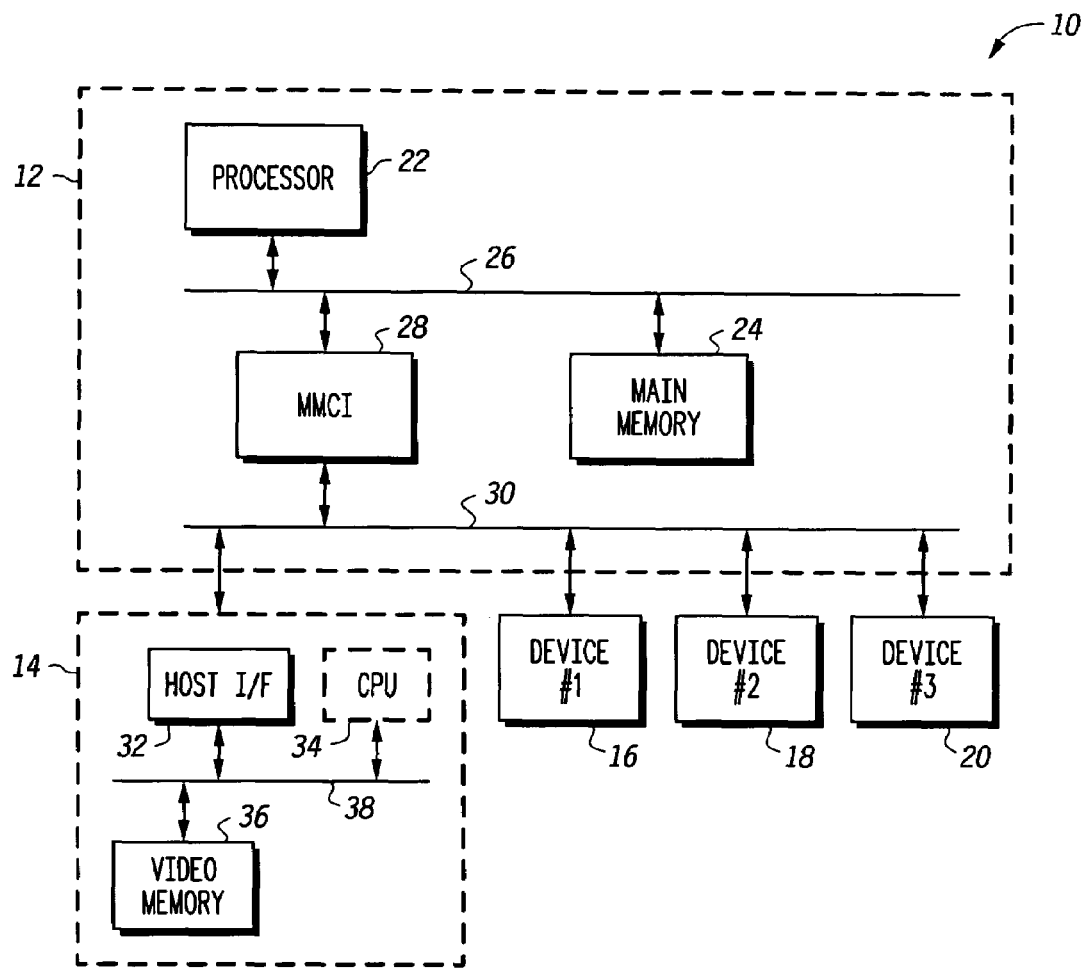
FIG. 1 is a block diagram view of a system for direct access to a non-memory mapped device memory according to one embodiment of the present disclosure.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

As used herein, the term "bus" is used to refer to a plurality of signals or conductors which may be used to transfer one or more various types of information, such as data, addresses, control, or status. The terms "assert" and "negate" is used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Brackets are used to indicate the conductors of a bus or the bit locations of a value. For example, "bus 60 [0-7]" or "conductors [0-7] of bus 60" indicates the eight lower order conductors of bus 60, and "address bits [0-7]" or "ADDRESS [0-7]" indicates the eight lower order bits of an address value. The symbol "$" preceding a number indicates that the number is represented in its hexadecimal or base sixteen form. The symbol "%" preceding a number indicates that the number is represented in its binary or base two form.

According to one embodiment of the present disclosure, a method for direct access to a non-memory mapped device buffer includes configuring a microcontroller unit. Configuring the microcontroller unit includes using a Memory Mapped Control Interface with a flexible template-based address and command translation mechanism, as is discussed herein.

The Memory Mapped Control Interface (MMCI) includes an "MCU system" to "pseudo MCU system" bus interface in which both a command and address are embedded into a data stream. When an MCU memory access transaction request arrives at the MMCI, the MMCI decodes the memory transaction address to perform some or all of the following: (a) select the targeted external device for the memory access if there is more than one; (b) download an appropriate access protocol template/templates which is/are previously programmed by the MCU host for each specific access type, and accordingly performs a series of transactions to setup communication with the external device; (c) in particular, insert the target memory address which is extracted from the host memory transaction address into the appropriate field of the message structure for the next transfer to the external device; and (d) start an actual data transfer, the data transfer including one of a read or write access from or to the external device memory.

According to an embodiment of the present disclosure, the MMCI provides an interface where a command and data are embedded into the data stream. In addition, the MMCI deals with or handles the message protocol (i.e. what command(s) or what sequence of command(s) are needed to be sent to the external device before and after the actual data transfer, etc.). Furthermore, the MMCI uses access templates to generate an access protocol to communicate with an external device.

Further as discussed herein, the memory map controller interface can include a physical interface. The memory map controller interface can also include various forms, such as, a data bus with read/write and control signals, or simply a high speed serial interface. Still further, in one embodiment, the MMCI can be configured to by-pass select ones of the templates, such as, in an instance of consecutive accesses of a certain type, for example, Burst Read/Write.

Turning now to FIG. 1, a block diagram view is shown of a system 10 having direct access to a non-memory mapped device memory according to one embodiment of the present disclosure. System 10 includes a microcontroller unit (MCU) 12 and at least one or more of external devices 14, 16, 18, and 20. MCU 12 includes a processor 22 and a main memory 24 coupled to processor 22 via a system bus 26. MCU 12 also includes a memory mapped control interface (MMCI) 28 coupled to the processor 22 and main memory 24 via system bus 26. As will be discussed further herein below, an output of MMCI 28 couples to the external devices 14, 16, 18 and 20 via external interface bus 30. Absent the MMCI 28, external devices 14, 16, 18 and 20 are devices containing memory external to MCU 12, further wherein the devices include non-memory mapped devices with respect to the MCU 12.

External device 14 may include a display controller or a graphics accelerator. For example, external device 14 may include a display controller, the display controller including a host interface 32, a CPU 34, a video memory 36, and a bus 38. Bus 38 couples between host interface 32, CPU 34 and video memory 36. External device 14 may also include a graphics accelerator. External devices 16-20 may also include similar types of off chip devices or devices that may or may not include addressable memory.

According to one embodiment, the system bus 26 consists of a data bus, an address bus, and other control and status signals. Every processor memory transaction requires the address to be put on the address bus and the data to be put on the data bus. When a processor performs a memory read/write transaction to the memory of an external device, the address portion of the transaction contains the information for MMCI about the operation that it is going to perform, the data portion of the transaction will be transparently available to the destination (i.e. the processor or external device memory) when the actual data transfer has taken place.

Figure 2:
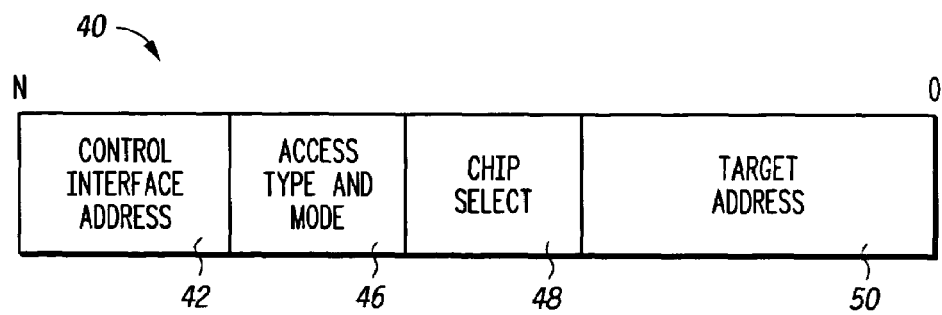
FIG. 2 is a block diagram view of the format of an address for use in the system for direct access to a non-memory mapped device memory according to one embodiment of the present disclosure.

FIG. 2 is a block diagram view of the format of an address 40 for use in the system for direct access to a non-memory mapped device memory according to one embodiment of the present disclosure. Address 40 includes an N-bit address containing a control interface base address portion 42, an access type and mode portion 46, a chip select portion 48, and a target address portion 50. Control interface base address portion 42 corresponds to a pointer for the MMCI 28. Portions 46, and 48 make up pointers to template information for use with a corresponding external device. Lastly, the target address portion 50 corresponds to a target address pointer, the target address pointer for pointing to a memory location within a memory of a corresponding external target device.

According to one embodiment of the present disclosure, a memory transaction address is requested by the MCU host and issued to an external device memory via the MMCI. For example, the MCU's Memory Transaction Address can be decomposed into one or more of the following possible parameters:

[Dn, . . . , D0]: represents the address of the targeted memory location within memory mapped device.
[CSm, CS0]: represents the device select.
[A1, A0]: represents the access type allowing the MMCI to load the appropriate access template(s) which contains the specific information and protocol to communicate with the external device.
[Sk,S0]: represents the address of MMCI within the host system memory map.

The following discussion provides an example of a memory transaction message structure between the MMCI and an external device. An external device may include, for example, a graphics accelerator, display controller, a peripheral device, a co-processor which may include embedded memory or other similar device. In one embodiment, the transaction message structure can include the following segments: PRE-CMND, ADDRESS, DATA(R/W), and POST-CMND. The PRE-CMND represents a pre-command access template that has one or several commands containing information and access protocol to establish communication with the external device. The POST-CMND represents a post-command access template which contains actual commands to complete the transaction. The ADDRESS represents a targeted address field that contains one or multiple address word(s). The DATA represents the actual data (read/write) field of the memory transaction, wherein it contains either a single or multiple data word.

Figure 3:
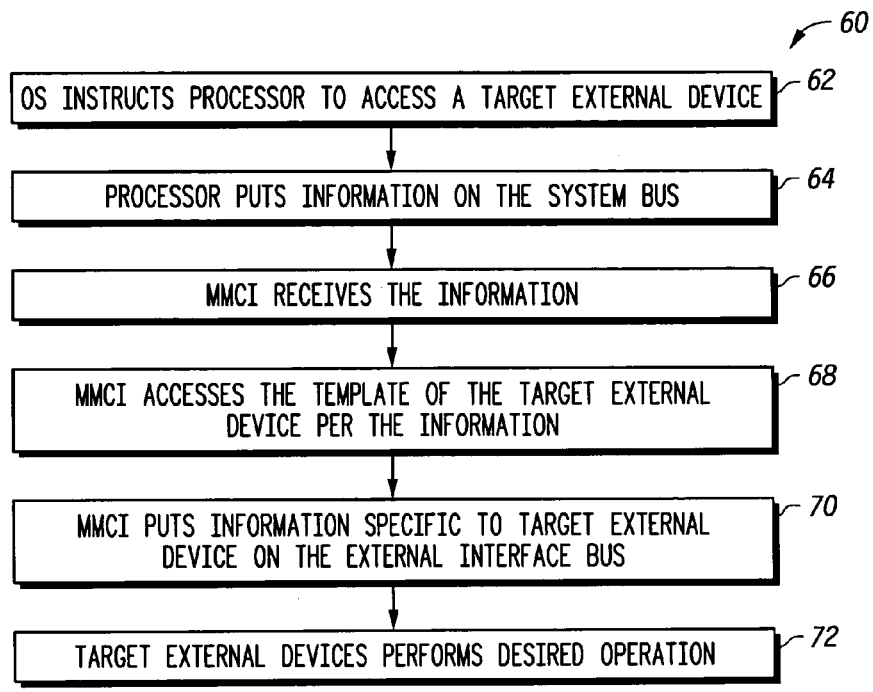
FIG. 3 is a flow diagram view of a method for direct access to a non-memory mapped device memory according to one embodiment of the present disclosure.

Referring now to FIG. 3, there is shown a flow diagram view 60 of a method for direct access to a non-memory mapped device memory according to one embodiment of the present disclosure. In a first step 62, an operating system instructs the processor 22 to access a target external device. The target external device can include, for example, one of devices 14, 16, 18 or 20. In a second step 64, the processor puts information on the system bus 26. In a third step 66, the MMCI 28 receives the information from the system bus, the information specifying a pointer to a template stored in the main memory 24 or memory (not shown) of the MMCI 12 for use in accessing the template information for a corresponding external device.

In a next step 68, the MMCI 28 accesses the template of the target external device per the corresponding address information of the address 40. In step 70, the MMCI puts information specific to the target external device on the external interface bus per the corresponding template. Lastly, in step 72, the target external device performs a desired operation, in response to the information processed according to the template.

Figure 4:
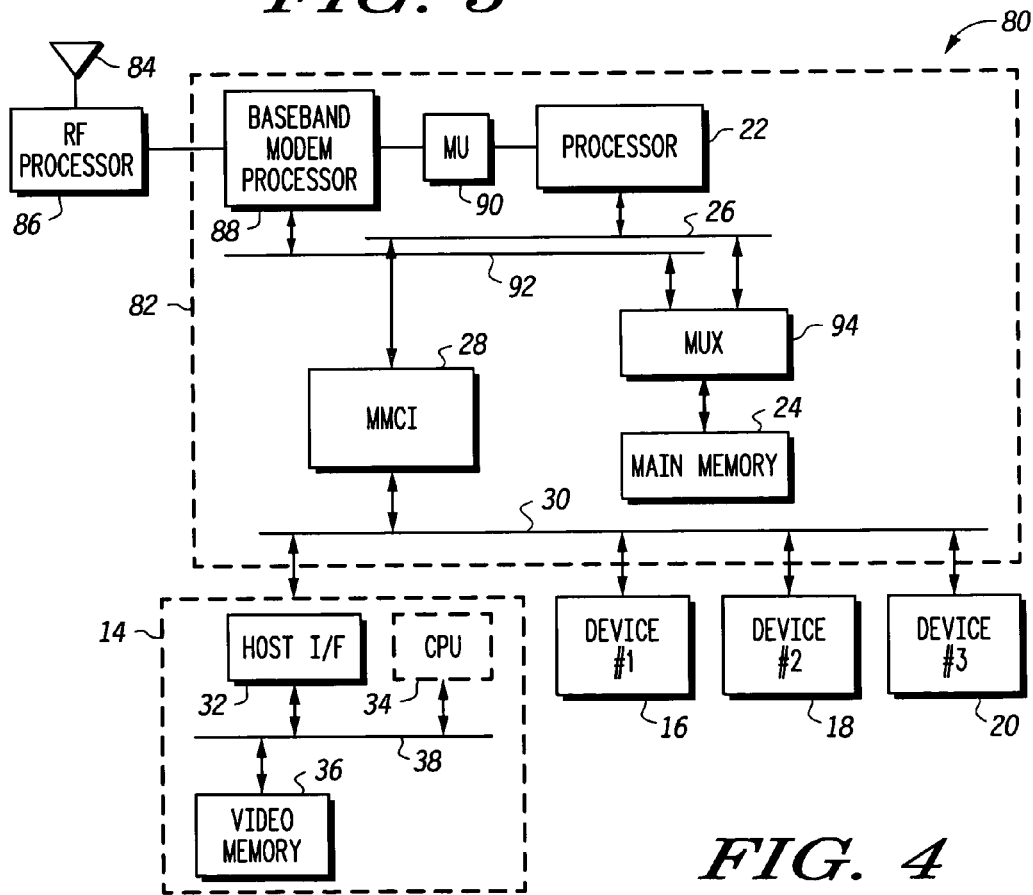
FIG. 4 is a block diagram view of a wireless device that incorporates a system for direct access to a non-memory mapped device memory according to one embodiment of the present disclosure.

FIG. 4 is a block diagram view of a wireless device 80 that incorporates a system for direct access to a non-memory mapped device memory according to another embodiment of the present disclosure. Device 80 can comprise a device that is similar to device 10 of FIG. 1 with the exception that device 80 also includes a wireless device. An exemplary wireless device can include, for example, a Smart Phone, a personal digital assistant (PDA), or other similar wireless device.

In addition to the elements discussed above with respect to FIG. 1, wireless device 80 of FIG. 4 further includes an antenna 84, an RF processor 86, a baseband modem processor 88 and a messaging unit 90 coupled between the main processor 22 and the base band modem processor 88. Still further, a system bus 92 is coupled between baseband processor 88 and multiplexer 94. Multiplexer 94 is coupled between system bus 26, system bus 92, and main memory 24. Furthermore, multiplexer 94 performs signal multiplexing as well as signal arbitration.

As discussed herein, the method for direct access to a non-memory mapped device can be used in baseband application processors. For example, in one embodiment, the MMCI can be integrated into an imaging processor unit (IPU), while the access templates can be located in an embedded memory of the IPU or in a system memory.

In a processing system having a processor coupled to a system bus according to one embodiment of the present disclosure, a method of operating a non-memory mapped device external to the processor includes instructing the processor to operate with the device. The device can include, for example, an LCD controller. Responsive to an instruction for the processor to operate with the device, the processor puts information onto the system bus.

In one embodiment, the system bus can include, for example, an address bus. In addition, the information can include a method of operation of the device. For example, the method of operation can be selected from a group consisting of read and write. In another embodiment, the information can include at least one of a mode of operation, chip select, access type, and an address.

Subsequent to the information being put onto the system bus, a memory map controller interface retrieves the information. In response to the information, the memory map controller interface accesses a template of the device. The template can be selected from a plurality of templates stored in a memory coupled to the system bus. The memory map controller interface then puts device information onto an external interface bus according to the information and the template. As a result, the device operates according to the device information.

According to another embodiment of the present disclosure, a wireless system includes an antenna, an RF processor, a baseband modem processor, a processor, a memory, a multiplexer, a memory map controller interface, and a display controller. The RF processor couples to the antenna. The baseband modem processor couples to the RF processor and to a modem bus. The processor couples to a system bus and to the baseband modem processor. The memory stores a plurality of templates for devices.

The wireless system further includes a multiplexer coupled to the memory, the modem bus, and the system bus. The memory map controller interface receives information about devices, retrieves templates from the memory, and provides device information onto an external interface bus according to the received information and the retrieved templates. Furthermore, a display controller couples to the external interface bus for responding to the device information. Still further, the wireless system includes an external device coupled to the external interface bus. In one embodiment, the information comprises at least one selected from the group consisting of a mode of operation, chip select, access type, and an address. In another embodiment, the system bus comprises an address bus that carries the information.

In another embodiment, a processing system for controlling devices via an external interface bus includes a processor, a memory, and a memory map controller interface. The processor couples to a system bus. The system bus may, for example, include an address bus. The memory couples to the system bus for storing templates, the templates for describing operating characteristics of the devices external to the processing system. Furthermore, the memory map controller interface couples to the system bus and to the external interface bus.

The memory map controller interface is further characterized as receiving information from the processor via the system bus and receiving templates from the memory via the system bus. The received information can include a mode of operation, chip select, access type, and an address. The templates can include data about operating characteristics of the external non-memory mapped devices. The templates may also include access protocols of the external non-memory mapped devices. At least one of the templates is for a display controller.

According to yet another embodiment of the present disclosure, a processing system includes a processor, a system bus, a memory, and a controller means. The processor couples to the system bus. The memory couples to the system bus for storing a plurality of templates. Furthermore, the controller means couples to the system bus and to an external interface bus.

The controller means responds to information provided by the processor concerning a device by retrieving a template of the plurality of templates. The controller means further provides the information, in a manner consistent with the retrieved template, on the external interface bus. Each template corresponds to a type of device and a mode of operation for the type of device. In one embodiment, at least one of the templates is for a display controller. In addition, the memory stores an operating system that identifies devices that are to be accessed.

The information provided by the processor to the controller means specifies a mode of operation. Furthermore, the information provided by the processor comprises a mode of operation, chip select, access type, and an address. The templates include access protocols of the external devices.

Accordingly, the various embodiments of the present disclosure provide unique features as follows. In one embodiment, the method and apparatus enables the MCU or DMA in the host system to read/write to an external display controller memory in the same way as it would access its memory or peripheral within its system address space. The embodiments provide an indirectly addressed device that looks like a memory mapped device, which significantly reduces pin count without adding complexity to the software. Furthermore, the embodiments significantly minimize software overhead, wherein minimizing software overhead greatly improves system performance. Moreover, the embodiments support all major operating systems without requiring the software driver to perform address translation.

There are operating systems that require VIDEO Memory to be memory mapped; however, many controllers do not allow the video memory to be mapped into the processor memory map. The embodiments of the present disclosure enable any processor which allows access to its internal memory to look like a flat memory to the operating system, hence allowing the operating system to use the device like any other memory mapped device. The embodiments then for the first time allow major operating systems to use a display video buffer that is not on the System Memory (device 24, FIG. #1) or on a peripheral that is directly connected to the Processor bus (device 26, FIG. #1).

Still further, the embodiments support a wide range of access procedures with a single flexible (i.e., programmable) interface. In one embodiment, access procedure information can be obtained from programmable templates that are stored in advance within the system memory.

The embodiments of the present disclosure further provide various ways to allow simulation of Memory-Mapped Memory for controllers that otherwise do not support such architectures. Accordingly, this enables the use of applications that are written for one or more display buffers in a system memory, to be used without any modification to the applications. Such embodiments are especially important for third party downloaded applications.

The apparatus according to one embodiment of the present disclosure is configured to off-load most of the MCU setup transactions with the external device to the MMCI to minimize the MCU intervention. Accordingly, this reduces power consumption and allows the MCU to perform other tasks in parallel to maximize system performance.

According to one embodiment of the present disclosure, the method and apparatus includes a flexible template based address and command translation mechanism. The template based address and command translation mechanism allows the host system to connect to a wide range of display controllers or graphics accelerators without having to redesign the chipset to provide support. The MMCI module decodes the address information requested by the processor and performs an appropriate access protocol to setup communication with an external device according to a corresponding specified access template. The host system memory provides a location for storing the access templates, the access templates for being used by the memory mapped control interface.

The embodiments of the present disclosure still further advantageously provide a solution for baseband application processors. The embodiments enable an MCU or DMA of the application processor to access an external display controller's or graphics accelerator's memory as it would access its own memory. Such accesses can be for image and video processing, video graphics combining, and graphics animation, etc. Furthermore, the embodiments maximize a system performance and minimize a power consumption of the application processor. Accordingly, the embodiments of the present disclosure enable the application processor to support a wide range of external devices.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. In a processing system having a host processor coupled to a system bus, a method of operating a non-memory mapped device memory with respect to the host processor, comprising:
   instructing the host processor to operate with the non-memory mapped device memory;
   putting information on the system bus, wherein the information comprises both a command and an address embedded in a data stream;
   retrieving the information with a memory map controller interface, wherein responsive to the information, the memory map controller interface
   (i) selects the non-memory mapped device memory for a memory access if there are more than one,
   (ii) downloads an appropriate access protocol template of the selected non-memory mapped device memory and performs a series of transactions to setup communication with the selected non-memory mapped device memory, wherein the appropriate access protocol template comprises a previously programmed template for each specific access type,
   (iii) inserts device information into an appropriate field of a message structure on an external interface bus for transfer to the non-memory mapped device memory according to the information and the template; and
   operating an actual data transfer with the non-memory mapped device memory according to the device information, wherein the information comprises a mode of operation, chip select, access type, and an address.

2. The method of claim 1, wherein the non-memory mapped device memory comprises a memory of an LCD controller, co-processor, peripheral device, graphic accelerator, imaging device or simply any peripheral with addressable registers or memory.

3. The method of claim 1, wherein the system bus contains an address bus.

4. The method of claim 1, wherein the information comprises a method of operation of the device.

5. The method of claim 4, wherein the method of operation is selected from a group consisting of read and write.

* * * * *